United States Patent
Kwon et al.

(10) Patent No.: US 12,481,928 B2
(45) Date of Patent: Nov. 25, 2025

(54) APPARATUS AND METHOD WITH MODEL TRAINING

(71) Applicant: Samsung Electronics Co., Ltd., Suwon-si (KR)

(72) Inventors: Ki Soo Kwon, Seoul (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 16/844,534

(22) Filed: Apr. 9, 2020

(65) Prior Publication Data

US 2021/0110273 A1    Apr. 15, 2021

(30) Foreign Application Priority Data

Oct. 10, 2019    (KR) .................. 10-2019-0125575

(51) Int. Cl.
| | |
|---|---|
| *G06N 99/00* | (2019.01) |
| *G06F 17/18* | (2006.01) |
| *G06N 3/045* | (2023.01) |
| *G06N 3/084* | (2023.01) |

(52) U.S. Cl.
CPC ............ *G06N 99/00* (2013.01); *G06F 17/18* (2013.01); *G06N 3/045* (2023.01); *G06N 3/084* (2013.01)

(58) Field of Classification Search
CPC .... G06N 3/084; G06N 3/0454; G06N 3/0445; G06N 3/08; G06N 3/04; G06F 17/18
See application file for complete search history.

(56) References Cited

U.S. PATENT DOCUMENTS

| | | | | |
|---|---|---|---|---|
| 11,288,452 B2* | 3/2022 | Axelrod | ............... | G06F 40/263 |
| 11,488,067 B2* | 11/2022 | Luong | ................... | G06N 20/00 |
| 11,922,281 B2* | 3/2024 | Luong | ................... | G06N 3/084 |
| 2009/0150308 A1* | 6/2009 | Wang | ...................... | G06F 16/35 |
| | | | | 706/12 |
| 2015/0269934 A1* | 9/2015 | Biadsy | ................. | G10L 15/197 |
| | | | | 704/235 |
| 2017/0083829 A1* | 3/2017 | Kang | ................... | G06N 3/0454 |

(Continued)

FOREIGN PATENT DOCUMENTS

| | | | |
|---|---|---|---|
| CN | 101937678 A | * | 1/2011 |
| CN | 103106632 A | * | 5/2013 |

(Continued)

OTHER PUBLICATIONS

P. Wang and et al, "Incorporating GAN for Negative Sampling in Knowledge Representation Learning", The Thirty-Second AAAI Conference on Artificial Intelligence 'AAAI-18', 2018 (Year: 2018).*

(Continued)

*Primary Examiner* — Douglas Kay
(74) *Attorney, Agent, or Firm* — NSIP Law

(57) ABSTRACT

A processor-implemented model training method and apparatus are provided. The method calculates an entropy of each of a plurality of previously trained models based on training data, selects a previously trained model from the plurality of previously trained models based on the calculated entropy, and trains a target model, distinguished from the plurality of previously trained models, based on the training data and the selected previously trained model.

28 Claims, 7 Drawing Sheets

(56) References Cited

U.S. PATENT DOCUMENTS

| | | | |
|---|---|---|---|
| 2017/0294186 A1 | 10/2017 | Pinto et al. | |
| 2019/0197406 A1* | 6/2019 | Darvish Rouhani | G06N 20/00 |
| 2020/0097772 A1* | 3/2020 | Nakanishi | G06N 3/08 |
| 2020/0364617 A1* | 11/2020 | Luong | G06N 3/088 |
| 2021/0026918 A1* | 1/2021 | Axelrod | G06N 20/00 |
| 2021/0074295 A1* | 3/2021 | Moreno | G10L 15/26 |
| 2021/0089955 A1* | 3/2021 | Bondesan | G06N 3/084 |
| 2021/0133553 A1* | 5/2021 | Van Den Heuvel | G06V 10/7788 |
| 2021/0366123 A1* | 11/2021 | Wang | G06V 10/82 |
| 2022/0156873 A1* | 5/2022 | Jang | G06T 3/40 |
| 2022/0199258 A1* | 6/2022 | Yoo | G16H 50/70 |
| 2023/0049747 A1* | 2/2023 | Luong | G06N 3/084 |

FOREIGN PATENT DOCUMENTS

| | | | |
|---|---|---|---|
| CN | 108877765 A | * | 11/2018 |
| CN | 108877813 A | * | 11/2018 |
| CN | 110086629 A | * | 8/2019 |
| CN | 110197665 A | * | 9/2019 |
| CN | 110491404 A | * | 11/2019 |
| CN | 109299716 B | * | 7/2021 |
| KR | 10-0404852 B1 | | 2/2004 |
| KR | 10-2017-0034258 A | | 3/2017 |
| KR | 10-2018-0134088 A | | 12/2018 |
| WO | WO 2018/126213 A1 | | 7/2018 |

OTHER PUBLICATIONS

Shen, Chengchao and et al. "Customizing student networks from heterogeneous teachers via adaptive knowledge amalgamation." In Proceedings of the IEEE/CVF International Conference on Computer Vision, pp. 3504-3513. Aug. 2019 (Year: 2019).*

Song, Malin, Qingyuan Zhu, Jun Peng, and Ernesto DR Santibanez Gonzalez. "Improving the evaluation of cross efficiencies: A method based on Shannon entropy weight." Computers & Industrial Engineering 112 (2017): 99-106 (Year: 2017).*

Price, Ryan, Ken-ichi Iso, and Koichi Shinoda. "Wise teachers train better DNN acoustic models." EURASIP Journal on Audio, Speech, and Music Processing 2016 (2016): 1-19 (Year: 2016).*

Chebotar, Yevgen et al., "Distilling knowledge from ensembles of neural networks for speech recognition", *Interspeech,* 2016 (pp. 3439-3443).

Yi, Jiangyan et al., "Distilling Knowledge from an Ensemble of Models for Punctuation Prediction", *Interspeech,* 2017 (pp. 2779-2783).

Gal, Yarin, et al., "Dropout as a Bayesian Approximation: Representing Model Uncertainty in Deep Learning", International Conference on Machine Learning, arXiv:1506.02142v6, Oct. 4, 2016, (12 Pages in English).

Korean Office Action Issued on Sep. 19, 2025, in Counterpart Korean Patent Application No. 10-2019-0125575 (2 Pages in English, 5 Pages in Korean).

* cited by examiner

APPARATUS AND METHOD WITH MODEL TRAINING

CROSS-REFERENCE TO RELATED APPLICATIONS

This application claims the benefit under 35 USC § 119(a) of Korean Patent Application No. 10-2019-0125575, filed on Oct. 10, 2019, in the Korean Intellectual Property Office, the entire disclosure of which is incorporated herein by reference for all purposes.

BACKGROUND

1. Field

The following description relates to an apparatus and method with model training.

2. Description of Related Art

Machine learning lightening technology reduces a size of a learning model or a learning time, and may minimize unnecessary information while maintaining an expressive or intuitive power of parameters of the learning model. The machine learning lightening technology may include, for example, a weight pruning technique may perform a pruning process by setting a value of an unnecessary parameter to "0" in a general training model that is over-parameterized.

A weight of a general model may have a floating-point value and another machine learning lightening technique may reduce a storage size of an actual model while maintaining an expressive power of existing deep learning by performing a quantization process that reduces the floating-point value to a predetermined bit number.

Another machine learning lightening technique is a binarization scheme that reduces a size of a model while maintaining accuracy by expressing a parameter as "0" and "1". A knowledge distillation scheme is another type of machine learning lightening technologies that reduces the time taken to train a model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes calculating an entropy of each of a plurality of previously trained models based on training data, selecting a previously trained model from the plurality of previously trained models based on the calculated entropy, and training a target model, distinguished from the plurality of previously trained models, based on the training data and the selected previously trained model.

The training of the target model may include calculating a first loss value of the target model based on the training data, calculating a second loss value of the target model and the previously trained model based on the training data, calculating a final loss value based on the calculated first loss value and the calculated second loss value; and training the target model based on the calculated final loss value.

The calculating of the final loss value may include determining the final loss value by applying a weighted average to the first loss value and the second loss value.

The calculating of the second loss value may include calculating a first output value by inputting the training data to the previously trained model, calculating a second output value by inputting the training data to the target model; and calculating the second loss value based on the first output value and the second output value.

The selecting of the previously trained model may include selecting a previously trained model that has a lowest entropy for the training data from among the plurality of previously trained models.

The selecting of the previously trained model may include selecting a first previously trained model and a second previously trained model from the plurality of previously trained models, a first entropy of the first previously trained model based on the training data and a second entropy of the second previously trained model based on the training data may have non-zero values, and a ratio of the first previously trained model and the second previously trained model may be determined based on the second entropy and the first entropy.

The training of the target model may include calculating a first loss value of the target model based on the training data, calculating a second loss value of the target model based on the first previously trained model and the second previously trained model, calculating a final loss value based on the calculated first loss value and the calculated second loss value; and training the target model based on the calculated final loss value.

The calculating of the second loss value may include calculating a first output value for the training data based on the first previously trained model and the second previously trained model, calculating a second output value by inputting the training data to the target model; and calculating the second loss value based on the calculated first output value and the calculated second output value.

The calculating of the first output value may include calculating a third output value by inputting the training data to the first previously trained model, calculating a fourth output value by inputting the training data to the second previously trained model; and calculating the first output value by applying a weighted average to the third output value and the fourth output value based on the first entropy and the second entropy.

In a general aspect, a processor-implemented method includes receiving a speech input data of a user, calculating an output value by inputting the received speech input data to a target model; and recognizing the user based on the output value, wherein the target model is trained based on a previously trained model that is selected based on an entropy of each of a plurality of previously trained models based on training data.

The method may include calculating an entropy of each of the plurality of previously trained models based on the training data, selecting the previously trained model from the plurality of previously trained models based on the calculated entropy; and training the target model, distinguished from the plurality of previously trained models, based on the training data and the selected previously trained model.

In a general aspect, a model training apparatus includes a processor configured to calculate an entropy of each of a plurality of previously trained models based on training data, select a previously trained model from the plurality of previously trained models based on the calculated entropy;

and train a target model based on the training data and the selected previously trained model.

The apparatus may include an input/output interface configured to receive the training data, and one or more memories storing the plurality of previously trained models.

The apparatus may further include a memory of the one or more memories storing instructions which, when executed by the processor, configures the processor to perform the calculating of the entropy, the selecting of the previously trained model, and the training of the target model.

The processor may be further configured to calculate a first loss value of the target model based on the training data, calculate a second loss value of the target model and the previously trained model based on the training data, calculate a final loss value based on the calculated first loss value and the calculated second loss value; and train the target model based on the calculated final loss value.

The processor may be further configured to determine the final loss value by applying a weighted average to the first loss value and the second loss value.

The processor may be further configured to calculate a first output value by inputting the training data to the previously trained model, calculate a second output value by inputting the training data to the target model; and calculate the second loss value based on the first output value and the second output value.

The processor may be further configured to select a previously trained model that has a lowest entropy for the training data from among the plurality of previously trained models.

The processor may be further configured to select a first previously trained model and a second previously trained model from the plurality of previously trained models, a first entropy of the first previously trained model based on the training data and a second entropy of the second previously trained model based on the training data have non-zero values, and a ratio of the first previously trained model and the second previously trained model is determined based on the second entropy and the first entropy.

The processor may be further configured to calculate a first loss value of the target model based on the training data, calculate a second loss value of the target model based on the first previously trained model and the second previously trained model, calculate a final loss value based on the calculated first loss value and the calculated second loss value; and train the target model based on the calculated final loss value.

The processor may be further configured to calculate a first output value for the training data based on the first previously trained model and the second previously trained model, calculate a second output value by inputting the training data to the target model, and calculate the second loss value based on the calculated first output value and the calculated second output value.

The processor may be further configured to calculate a third output value by inputting the training data to the first previously trained model, calculate a fourth output value by inputting the training data to the second previously trained model; and calculate the first output value by applying a weighted average to the third output value and the fourth output value based on the first entropy and the second entropy.

In a general aspect, a processor-implemented method includes calculating first entropies of first teacher models of a first characteristic, calculating second entropies of second teacher models of a second characteristic different from the first characteristic, determining a lowest entropy of the first entropies of the first teacher models, and a lowest entropy of the second entropies of the second teacher models; selecting one of the first teacher model and the second teacher model having a lowest entropy based on training data; and training a student model based on an output of the selected teacher model, and the training data.

The first characteristic may be a first utterance distance, and the second characteristic may be a second utterance distance.

The output of the selected teacher model may be based on an entropy for each frame of the training data.

The selected teacher model may correspond to the training data.

Other features and aspects will be apparent from the following detailed description, the drawings, and the claims.

Figure 1:
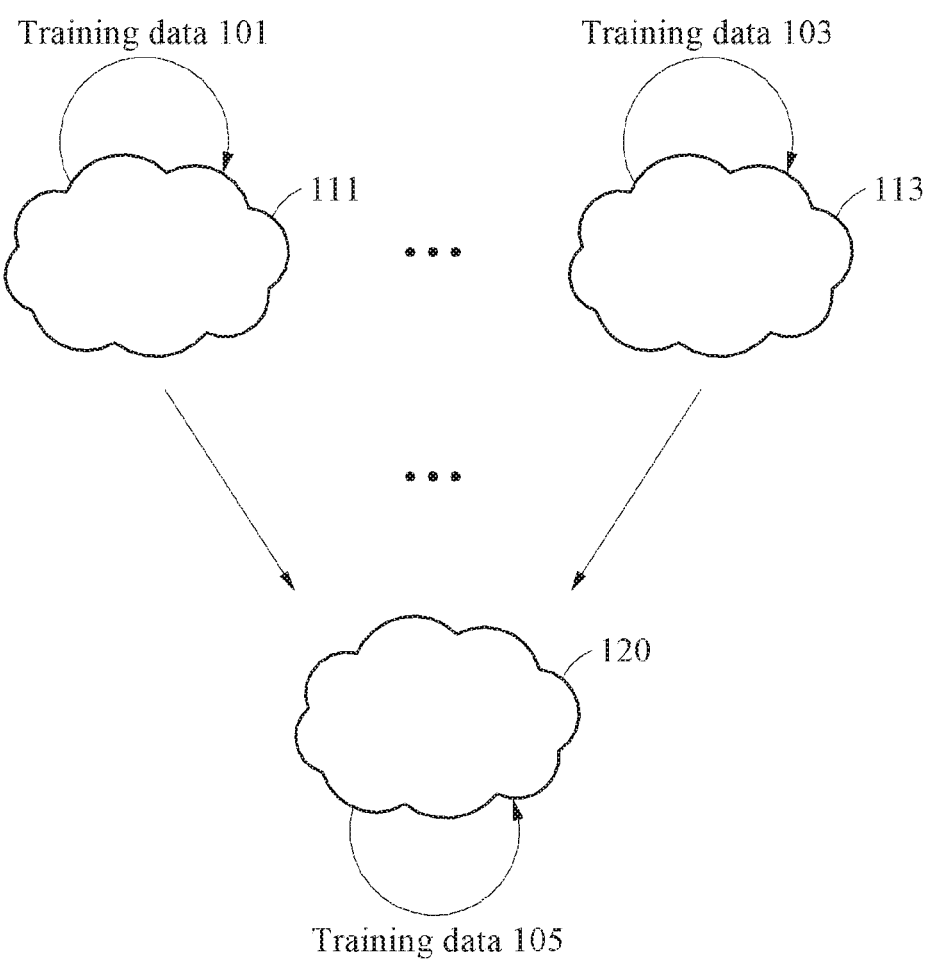
FIG. 1 illustrates an example process in which a target model is trained by a model training apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example process in which a target model is trained by a model training apparatus.

Referring to FIG. 1, the model training apparatus may train a target model 120 using a plurality of previously trained models, for example, previously trained models 111 and 113. In an example, the model training apparatus may select one previously trained model from the previously trained models 111 through 113, and use the selected previously trained model to train the target model 120. The model training apparatus may select a previously trained model based on entropies of the previously trained models 111 through 113 based on training data, or based on an entropy of each of the prior training models 111 through 113 based on training data, and may use the selected previously trained model to train the target model 120. Thus, the model training apparatus may apply a knowledge distillation scheme based on an entropy, to achieve a training effect with a higher accuracy. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The model training apparatus may be utilized in fields to which machine learning is applied. As non-limiting examples, the model training apparatus includes examples in various fields, for example, a speech recognition field, a voice recognition field, or an image recognition field. In an example, recognition may include a verification and an identification. The model training apparatus may train the target model 120 using the previously trained models 111 and 113 that are trained in advance based on a large quantity of speech training data. The previously trained models 111 and 113 may be trained based on the same speech training data, or different pieces of speech training data. In an example, when the previously trained models 111 and 113 are trained based on different pieces of speech training data, the previously trained models 111 and 113 may be specified to a condition of each of pieces of the speech training data. In this example, the target model 120 may receive a knowledge or intuition from the previously trained models 111 and 113 specialized under different conditions, and may achieve a higher accuracy in a generalized environment. Also, the previously trained models 111 and 113 and the target model 120 may be, as a non-limiting example, neural networks.

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The training of a neural network may mean determining and updating weights and biases between layers or between a plurality of nodes (or neurons) that belong to different layers of adjacent layers. However, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

For example, the weight and biases of a layer structure or between layers or neurons may be collectively referred to as connectivity of a neural network. Accordingly, the training of a neural network may denote establishing and training connectivity.

Each node multiplies an input value by a weight, adds a bias, and applies an activation function, to derive an output value. The activation function determines a form of a value passing through an artificial neural network. The neural network may include a plurality of layers that respectively include a plurality of nodes, where the plural layers may include an input layer, one or more hidden layers and an output layer, as non-limiting examples. An error or loss of a result output by the output layer is propagated backwards along a neural network, and a parameter of each of the nodes is adjusted. The above scheme is referred to as a "back-propagation scheme."

In an example, the neural network may be a deep neural network (DNN), as a non-limiting example. The DNN may include a plurality of layers. For example, the deep neural network may include the input layer to which input data is applied, the output layer for outputting a result derived through prediction based on training and the input data, and the plurality of hidden layers for performing a neural network operation between the input layer and the output layer.

In an example, the input layer may correspond to, or may be referred to as, the lowest layer of the neural network, and the output layer may correspond to, or may be referred to as, the highest layer of the neural network. A layer order may be assigned and named or referred to sequentially from the output layer that is the highest layer to the input layer that is the lowest layer. For example, Hidden Layer 2 may correspond to a layer higher than Hidden Layer 1 and the Input Layer, but lower than the Output Layer.

The DNN may be one or more of a fully connected network, a convolution neural network, a recurrent neural network, and the like, or may include different or overlapping neural network portions respectively with such full, convolutional, or recurrent connections, according to machine learning used to process information. The neural network may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples.

A method of training a neural network is referred to as deep learning, and as described above, the deep learning may use various machine learning approaches, such as in a convolution neural network or a recurrent neural network.

To process big data that includes an image, sound, or text, deep learning using a neural network has been implemented. The deep learning herein includes big data being able to be efficiently learned along with development of an example hardware technology, for example, an example graphics processing unit (GPU).

Examples herein include implementations with 5G communications, biometrics, automation, image data, and the processing of big data of a larger scale. Accordingly, examples of lightening of neural networks and example terminal devices are available herein.

A lightening approach herein may simplify operations and provide a reduced size of the neural network, e.g., while maintaining accuracy of existing training models. Such a provided neural network may provide, for example, a reduction in latency, the protection of personal information, or a reduction in network traffic. The lightening may be classified into a lightweight approach that may maximize efficiency compared to existing models by providing an approach that is implemented with less computation, and may have a more efficient structure, and an approach that may use a scheme, such as a model compression to reduce parameters of an existing model.

Knowledge distillation scheme may be a type of lightening that may reduce a time utilized to train a model. The knowledge distillation scheme may reduce a training time by utilizing a model that is trained in advance during the training of a new model. The knowledge distillation scheme may be a scheme related to a knowledge delivery from a plurality of big models trained by an ensemble scheme into a new model. The knowledge distillation scheme may change probability values of experts or teacher models, which are trained based on a plurality of pieces of training data to multidimensional distribution values, and reflect the multidimensional distribution values to training of a specialist or student model.

For example, based on a probability value of a teacher model, a correct answer of training data given by a vector with "0" or "1" may be expressed as a vector with a real number that is greater than or equal to "0" and less than or equal to "1", and accordingly more detailed information may be transferred to a student model. A loss value of a teacher model and a loss value of a student model may be simultaneously reflected to the student model, and the student model learns a knowledge of the teacher model.

Referring to FIG. 1, the model training apparatus trains the target model 120 based on output values of the previously trained models 111 and 113 in combination with training data 105. In an example, the previously trained models 111 and 113 are referred to as "teacher models", the target model 120 is referred to as a "student model", and the output values of the previously trained models 111 and 113 are referred to as "prediction values". The model training apparatus may select the previously trained models 111 and 113 based on determined entropies of the previously trained models 111 and 113 with respect to each training data. The model training apparatus may train the target or student model 120 based on the training data 105 and output values of the selected previously trained models 111 and 113. The training data for the previously trained models 111 and 113, and the target model 120 may include image data, voice data, and text data. However, these are provided as examples only, and other types of data are considered to be well within the scope of the present disclosure.

The previously trained models 111 and 113 may be trained in advance. The previously trained models 111 and 113 may be trained based on training data 101 and 103, respectively. In an example, the training data 101 and 103 may be different from each other. Thus, in a non-limiting example, the previously trained models 111 and 113 may be specialized for each of the training data 101 and 103. In a non-limiting example, when the training data 101 and 103 that are used to train the respective previously trained models 111 and 113 are different from each other, the previously trained models 111 and 113 may have different characteristics, and the target model 120 may derive a more accurate result under more general conditions based on the characteristically different data received from the previously trained models 111 and 113.

For example, in a non-limiting example, the previously trained model 111 may be a speech recognition model specialized for speech that is detected over short distances, and the previously trained model 113 may be a speech recognition model specialized for speech that is detected over long distances. In a non-limiting example, the previously trained model 111 may be a speech recognition model specialized for speech that is initiated over Bluetooth systems, radio frequency identification (RFID) systems, infrared data association (IrDA), ultra-wideband (UWB), Zig-Bee, and wireless fidelity (Wi-Fi) technologies. In a non-limiting example, the previously trained model 113 may be a speech recognition model specialized for code division multiple access (CDMA), frequency division multiple access (FDMA), time division multiple access (TDMA), orthogonal frequency division multiple access (OFDMA), and single carrier frequency division multiple access (SC-FDMA) communications.

In yet another non-limiting example, the previously trained model 111 may be a speech recognition model that is specialized for devices that are located a short distance (e.g., less than 3 ft) from a user who makes an utterance. For example, a user speaking on a mobile phone.

In a non-limiting example, the previously trained model 113 may be a speech recognition model specialized for devices located at a long distance (e.g., 3 ft or more) from the user who makes an utterance.

The training data 101, 103 and 105 may include various types of data. In a non-limiting example, the training data 101, 103 and 105 may include speech data. The speech data may be data of a wave format of a predetermined unit. The training data 101, 103 and 105 may include a feature vector in a format of a filter bank converted to frequency-time axis data. For example, the training data 101, 103 and 105 may include speech data of a frame with a length of 10 ms. A correct answer of the training data 101, 103 and 105 may be a vector with a value of "0" or "1".

The training data 105 may have a correct answer of a binarized one-hot of "0" or "1". In an example, "one-hot" is a group of bits among which desired combinations of values are only those with a single high (1) bit and all the others low (0). For example, an output state of, for example, a phone or a wordpiece, indicated by the training data 105 may be expressed in a form of a binarized one-hot. For example, the correct answer of the training data 105 may be expressed by "1" or "0". Also, each of output values output by the prior training models 111 and 113 may have a real number that is greater than or equal to "0" and less than or equal to "1". The training data 105 may have a plurality of dimensions, and the training data 105 may be expressed by a vector with "0" or "1". The output values of the previously trained models 111 and 113 may be expressed by a vector with values that are greater than or equal to "0" and less than or equal to "1". The previously trained models 111 and 113 may provide a variety of information associated with the training data 105 based on a smoothing effect.

The previously trained models 111 and 113 that are used to train the target model 120, may be selected based on an entropy. In a non-limited example, the training data 105 may be input to each of the previously trained models 111 and 113, in addition to being input to the target model 120. The previously trained models 111 and 113 may output values, each having a real number that is greater than or equal to "0" and less than or equal to "1". A sum of the output values of the previously trained models 111 and 113 passing through a loss function, for example, a softmax function may be "1". The above output values may be easily converted to entropies. An entropy may indicate a confidence in a correct answer. An output value corresponding to a high entropy may represent an indeterminate result, which may indicate that a corresponding previously trained model does not have a confidence in the training data 105. An output value corresponding to a low entropy may represent a clear result, which may indicate that a corresponding previously trained model has a confidence in the training data 105.

The model training apparatus may select a previously trained model that is to be used to train the target model 120 together with the training data 105. The model training apparatus may select the previously trained models 111 and 113 based on entropies of output values of the previously trained models 111 and 113 based on the training data 105. The model training apparatus may select a previously trained model with a low entropy corresponding to the training data 105. The model training apparatus may train the target model 120 based on a combination of the training data 105 and an output value of the selected previously trained model. The model training apparatus may use an output value of the selected previously trained model to calculate an additional loss value of the target model 120.

In an example, the model training apparatus may select an output value of a previously trained model based on determined respective entropies for each frame of the training data 105. In another example, the model training apparatus may select an output value of a previously trained model based on an entropy for each frame with a predetermined length in the training data 105. In another example, the model training apparatus may obtain an average value of entropies for each wave data of the input training data 105 and select an output value of a previously trained model based on the average value.

In an example, the model training apparatus may convert speech data that is to be used for training to a filter bank of time/frequency domains. The model training apparatus may convert the previously trained models 111 and 113 and the target model 120 into bank. The model training apparatus may calculate a main loss value that reflects a difference between a correct answer and an output value output from the target model 120. The model training apparatus may select an output value that has a lowest entropy among entropies of output values output from the previously trained models 111 and 113. The model training apparatus may calculate an extra loss value that reflects a difference between the selected output value and the output value of the target model 120. The model training apparatus may calculate a weighted average of the main loss value and the extra loss value as a total loss value. For example, the model training apparatus may obtain the total loss value by calculating "0.5×main loss value+0.5×extra loss value". The model training apparatus may update a parameter of the target model 120 based on a gradient of the total loss value.

TABLE 1

| First prior training model | Second prior training model | Additional module | Target model | Short distance TC | Long distance TC | Average WER |
|---|---|---|---|---|---|---|
| — | — | — | Short-distance model | 4.02% | 8.34% | 6.18% |
| — | — | — | Long-distance model | 4.25% | 7.21% | 5.73% |
| Long-distance model | — | — | Short-distance model | 3.65% | 6.69% | 5.17% |
| Long-distance model | Short-distance model | Same weight | Long-distance model | 3.86% | 6.45% | 5.16% |
| Long-distance model | Short-distance model | Entropy | Long-distance model | 3.72% | 6.29% | 5.01% |

In an example, the model training apparatus may train the target model 120 to be robust against long-distance and short-distance speech recognition based on long-distance training data and short-distance training data. Referring to Table 1, an average word error rate (WER) of a short-distance model trained based on short-distance training data and noise data is 6.18%, and an average WER of a long-distance model trained based on long-distance training data, short-distance training data, and noise data is 5.73%. A third row shows an average WER of the target model 120 in an example in which a single previously trained model is used. For example, when a first previously trained model is a long-distance model, an average WER of the target model 120 trained based on an output value of the first previously trained model and short-distance training data is 5.17%. A fourth row shows a result obtained by performing a weighted average operation on output values of two previously trained models using the same weight, and a result obtained by training the target model 120 based on long-distance training data. An average WER of the target model 120 is 5.16%. A last row shows a result obtained by performing a training by the model training apparatus. The target model 120 may be trained using two previously trained models and long-distance training data and an output value selected based on an entropy. An average WER of the target model 120 is 5.01%, that is, the best WER is achieved.

In Table 1, "-" means that the feature is not applicable for the discussed aspect.

As described above, the model training apparatus may implement a plurality of previously trained models to solve an overfitting problem occurring when a single previously trained model is used. Additionally, the model training apparatus may select an appropriate previously trained model using an entropy, to avoid a problem in that expertise of both is weakened by a simple combination of a plurality of previously trained models.

Figure 2:
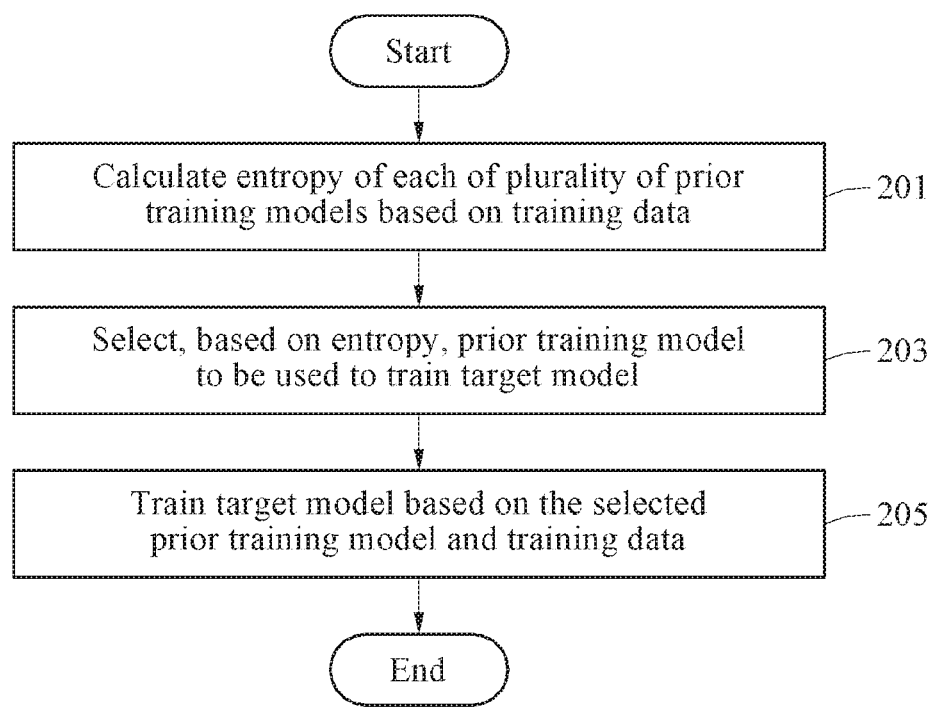
FIG. 2 is a flowchart illustrating an example model training method, in accordance with one or more embodiments.

FIG. 2 is a flowchart illustrating an example model training method, in accordance with one or more embodiments. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, a model training apparatus calculates an entropy of each of a plurality of previously trained models based on training data. For example, a sum of output values of previously trained models passing through a loss function, for example, a softmax function, may be "1". In this example, the output values may be easily converted to entropies.

In operation 203, the model training apparatus selects, based on the entropy, a previously trained model that is to be used to train a target model. The model training apparatus may select a previously trained model with a lowest entropy for training data from the plurality of previously trained models. Although only two previously trained models are provided in the following description, this is merely an example. A plurality of prior training models may be used.

$$\text{if } H(\hat{y}_{T1}(t)) > H(\hat{y}_{T2}(t)), \text{ then } \hat{y}_T(t) = \hat{y}_{T2}(t),$$
$$\text{else } \hat{y}_T(t) = \hat{y}_{T1}(t) \qquad \text{Equation 1:}$$

In Equation 1, $\hat{y}_{T1}(t)$ denotes an output value of a first previously trained model, $\hat{y}_{T2}(t)$ denotes an output value of a second previously trained model, $H(\hat{y}_{T1}(t))$ denotes an entropy of the output value of the first previously trained model, $H(\hat{y}_{T2}(t))$ denotes an entropy of the output value of the second previously trained model, and $\hat{y}_T(t)$ denotes a selected output value. Based on Equation 1, an output value of a previously trained model with a lower entropy may be selected.

In operation 205, the model training apparatus trains a target model based on the selected previously trained model and training data.

The model training apparatus calculates a first loss value of the target model based on the training data. The model training apparatus calculates a second loss value for the target model and the previously trained model based on the training data. The model training apparatus acquires a first output value by inputting the training data to the previously trained model. The model training apparatus acquires a second output value by inputting the training data to the target model. The model training apparatus may calculate the second loss value based on the first output value and the second output value.

The model training apparatus calculates a final loss value based on the first loss value and the second loss value. For example, the model training apparatus may apply a weighted average to the first loss value and the second loss value to acquire the final loss value. The model training apparatus may train the target model based on the final loss value.

$$L_{total}(t) = \alpha L_m(t) + (1-\alpha)\|\hat{y}_T(t) - \hat{y}(t)\|, \ 0 < \alpha < 1 \qquad \text{Equation 2:}$$

In Equation 2, $L_{total}(t)$ denotes a total loss value, and $L_m(t)$ denotes a main loss value. Based on Equation 2, an absolute value of a difference between a selected output value and an output value of the target model may be calculated. The absolute value is an extra loss value. The total loss value is calculated by applying a weighted average to the main loss value and the extra loss value.

In an example, the model training apparatus selects one or more of the plurality of previously trained models. The model training apparatus may select the first previously trained model and the second previously trained model from the plurality of previously trained models. Here, a first entropy of the first previously trained model and a second entropy of the second previously trained model may not be zero.

The model training apparatus calculates a first loss value of the target model with respect to the training data. The model training apparatus calculates a second loss value of the target model with respect to the first previously trained model and the second previously trained model. The model training apparatus calculates a final loss value based on the first loss value and the second loss value. The model training apparatus trains the target model based on the final loss value.

The model training apparatus calculates a first output value based on the training data using the first previously trained model and the second previously trained model. The model training apparatus acquires a second output value by inputting the training data to the target model. The model training apparatus calculates the second loss value based on the first output value and the second output value.

In an example, the model training apparatus acquires a third output value by inputting the training data to the first previously trained model. The model training apparatus acquires a fourth output value by inputting the training data to the second previously trained model. The model training apparatus applies a weighted average to the third output value and the fourth output value based on the first entropy and the second entropy to calculate the first output value.

$$\hat{y}_T(t) = \frac{H(\hat{y}_{T2}(t))}{H(\hat{y}_{T1}(t)) + H(\hat{y}_{T2}(t))} * \hat{y}_{T1}(t) + \frac{H(\hat{y}_{T1}(t))}{H(\hat{y}_{T1}(t)) + H(\hat{y}_{T2}(t))} * \hat{y}_{T2}(t)$$

Equation 3

Based on Equation 3, the model training apparatus applies a weighted average to $\hat{y}_{T1}(t)$ and $\hat{y}_{T2}(t)$ that are output values of the first previously trained model and the second previously trained model at a ratio of the second entropy $H(\hat{y}_{T2}(t))$ and the first entropy $H(\hat{y}_{T1}(t))$, and calculates an output value that is to be compared to an output value of the target model. The ratio of the first previously trained model and the second previously trained model reflected in the first output value may be determined according to the second entropy and the first entropy, respectively.

Figure 3:
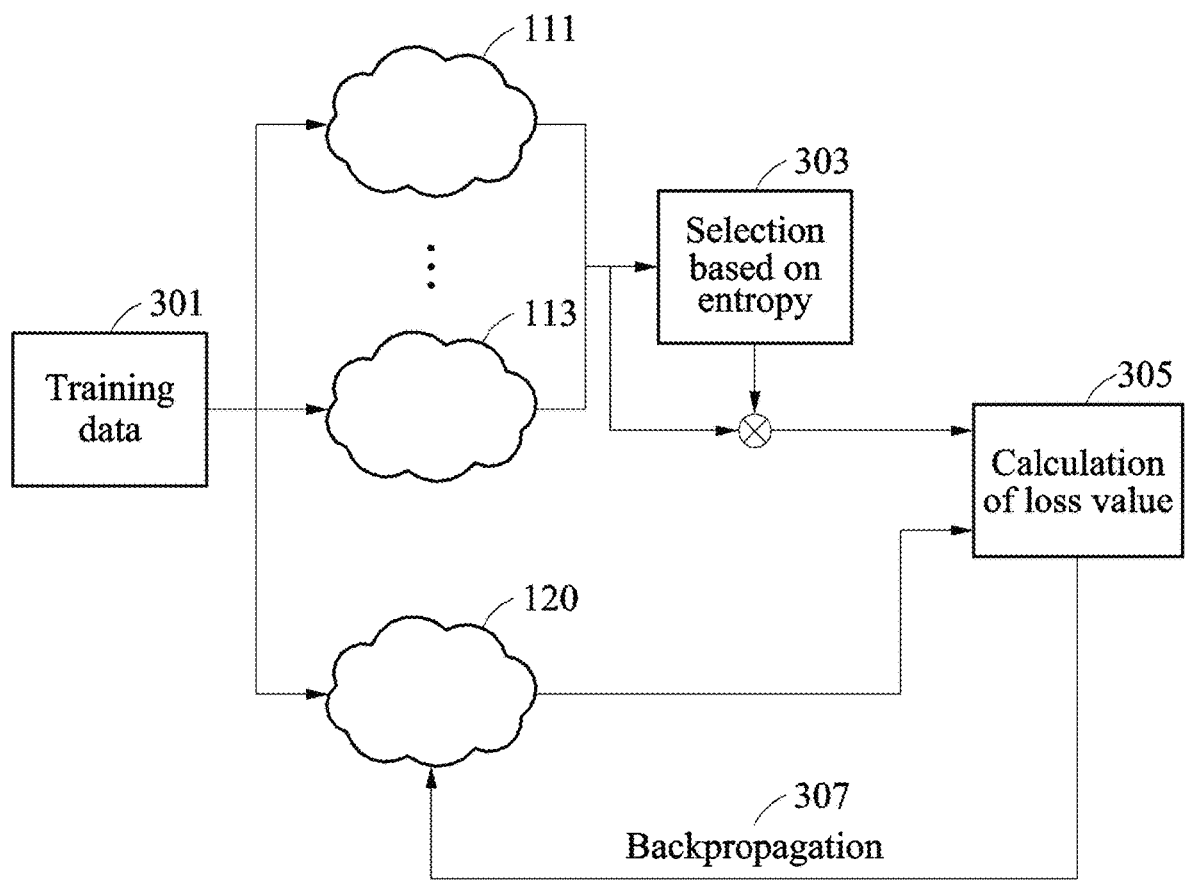
FIG. 3 illustrates an example process of training a target model based on a model training method, in accordance with one or more embodiments.

FIG. 3 illustrates an example of a process training a target model based on a model training method, in accordance with one or more embodiments.

Referring to FIG. 3, a model training apparatus trains a target model 120 by implementing previously trained models 111 and 113 that are trained in advance. The model training apparatus inputs training data 301 to the previously trained models 111 and 113. Each of the previously trained models 111 and 113 outputs an output value with respect to the training data 301.

The model training apparatus calculates an entropy of each of the output values of the previously trained models 111 and 113. In operation 303, the model training apparatus selects one or more previously trained models that is to be used to train a target model 120 from the previously trained models 111 and 113 based on an entropy. Selecting the previously trained model may include selecting an output value output from the previously trained model in correspondence to the training data 301. In an example, the model training apparatus may select an output value of a previously trained model with a lowest entropy based on training data.

In operation 305, the model training apparatus calculates a total loss value based on an output value output by inputting the training data 301 to the target model 120 and an output value selected from the previously trained model. The model training apparatus calculates an extra loss value of an output value of the target model 120 using the output value of the previously trained model as a correct answer. The model training apparatus determines an absolute value of a difference between the output value of the target model 120 and the output value of the previously trained model as an extra loss value. The model training apparatus determines a main loss value by comparing a correct answer included in the training data 301 and the output value of the target model 120. The model training apparatus calculates a total loss value by combining the extra loss value and the main loss value. For example, the model training apparatus may calculate the total loss value by applying a weighted average to the extra loss value and the main loss value using a preset weight. The main loss value is a loss value that is determined based on a difference between a correct answer and an output value output from the target model 120. The extra loss value is a loss value that is determined based on a difference between a lowest entropy selected among entropies of output values output from the previously trained models 111 and 113, and the output value of the target model 120.

In operation 307, the model training apparatus updates the parameters of the target model 120 using a backpropagation scheme based on the final loss value. The model training apparatus may adjust weights and a bias of a hidden layer of the target model 120 based on the final loss value.

Figure 4A:
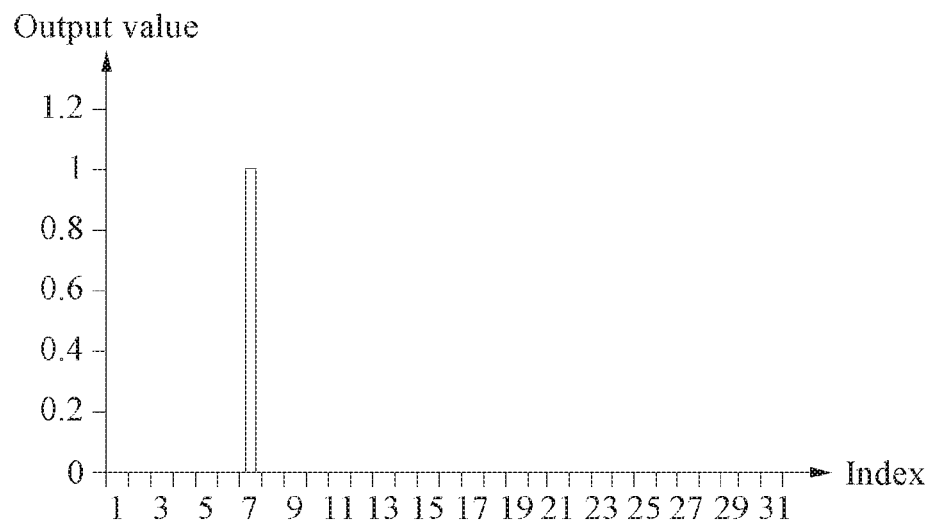
FIG. 4A illustrates an example of a graph showing an output value output in response to predetermined training data being input to a target model, in accordance with one or more embodiments.
Figure 4B:
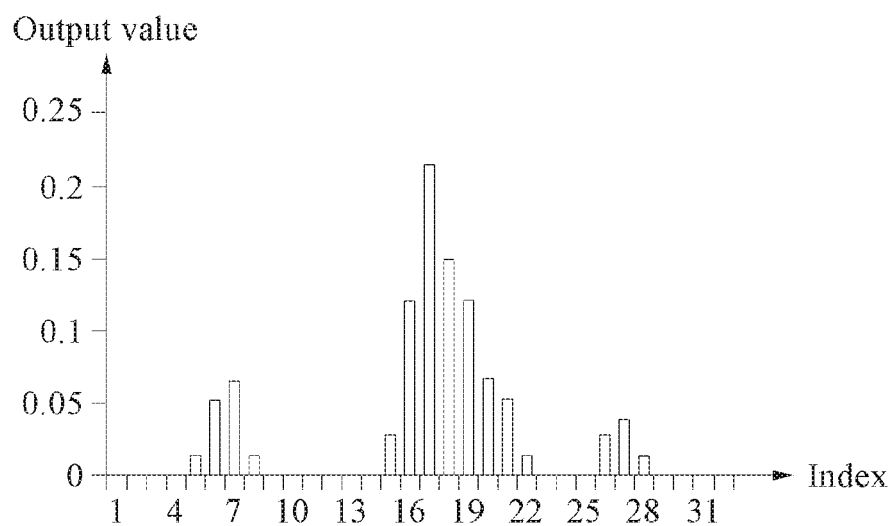
FIG. 4B illustrates an example of a graph showing an output value output in response to predetermined training data being input to a first prior training model, in accordance with one or more embodiments.
Figure 4C:
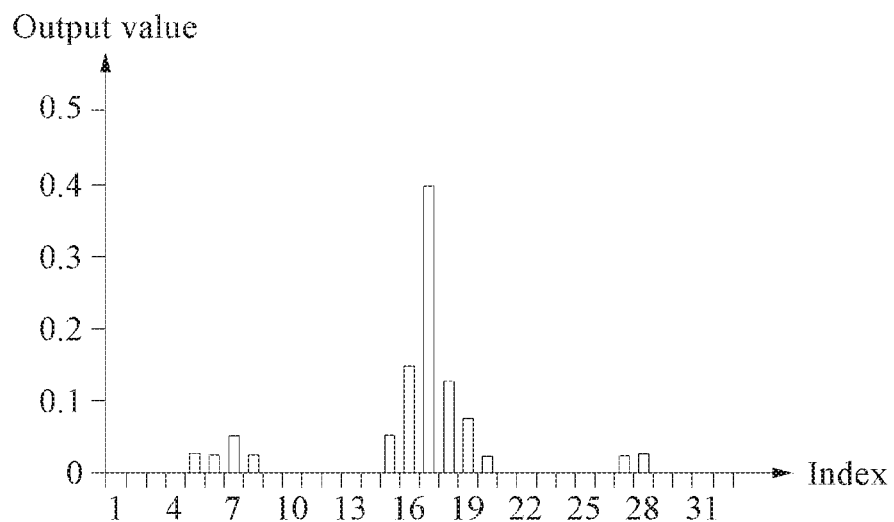
FIG. 4C illustrates an example of a graph showing an output value output in response to predetermined training data being input to a second prior training model, in accordance with one or more embodiments.

FIG. 4A illustrates an example of a graph showing an output value that is output in response to predetermined training data being input to a target model. FIG. 4B illustrates an example of a graph showing an output value that is output in response to predetermined training data being input to a first previously trained model. FIG. 4C illustrates an example of a graph showing an output value that is output in response to predetermined training data being input to a second previously trained model.

When training data is input to a previously trained model, the previously trained model may output an output value. When the training data includes a plurality of indices, the output value may output a vector including a predicted value for the plurality of indices. An entropy is relative to a confidence in the predicted value. When the entropy decreases, the confidence in the predicted value increases.

Referring to FIG. 4A, a first previously trained model receives, as an input, the training data and outputs a vector with a predicted value of "1" corresponding to an index 7. The first previously trained model determines that the index 7 is a correct answer. An entropy of the first previously trained model for the training data may have a low value.

Referring to FIG. 4B, a second previously trained model receives, as an input, the training data and outputs a vector with predicted non-zero values corresponding to a plurality of indices. The second previously trained model may have a lower confidence in predicted values corresponding to the plurality of indices than that of the first prior training model. An entropy of the second previously trained model for the training data may have a higher value than an entropy value of the first previously trained model.

Referring to FIG. 4C, a third previously trained model may receive, as an input, the training data, and output a vector with predicted non-zero values corresponding to a plurality of indices. The third previously trained model may have a lower confidence in predicted values corresponding to the plurality of indices than a confidence of the first previously trained model and a higher confidence in predicted values corresponding to the plurality of indices than a confidence of the second previously trained model. An entropy of the third previously trained model for the training data may have a value higher than an entropy value of the first previously trained model and lower than an entropy of the second previously trained model.

Figure 5:
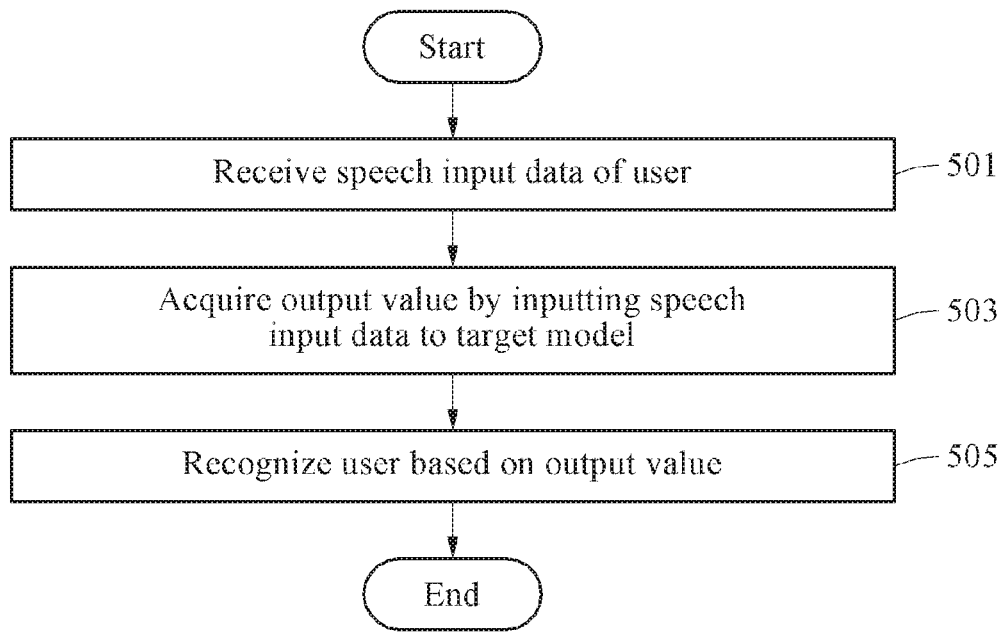
FIG. 5 is a flowchart illustrating an example speech recognition method, in accordance with one or more embodiments.

FIG. 5 is a flowchart illustrating an example speech recognition method, in accordance with one or more embodiments. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4B are also applicable to FIG. 5, and are incorporated herein by reference. Thus, the above description may not be repeated here.

Referring to FIG. 5, in operation 501, a speech recognition apparatus receives speech input data of a user. The speech input data may be, for example, data of a wave format of a predetermined unit. The speech input data may include a feature vector in a form of a filter bank converted to frequency-time axis data.

In operation 503, the speech recognition apparatus may acquire an output value by inputting the speech input data to a target model. The target model may be trained using a previously trained model selected based on an entropy of each of a plurality of previously trained models based on training data, where the training data corresponds to the selected previously trained model.

In operation 505, the speech recognition apparatus may recognize the user based on the output value. Although the speech recognition apparatus may recognize the user as described above, examples of the speech recognition apparatus are not limited thereto. For example, the speech recognition apparatus may include a translation model or an autonomous dialogue model.

Figure 6:
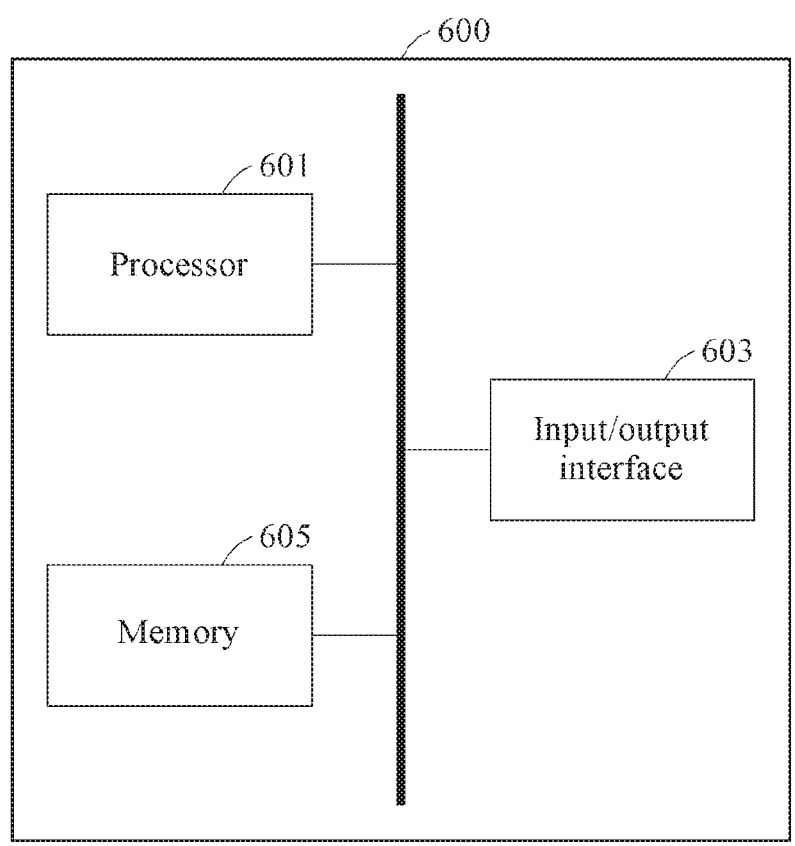
FIG. 6 illustrates an example model training apparatus, in accordance with one or more embodiments.

FIG. 6 illustrates an example model training apparatus 600, in accordance with one or more embodiments.

Referring to FIG. 6, the model training apparatus 600 may include one or more processors 601, an input/output interface 603 configured to receive, as an input, training data, and one or more memories 605 configured to store a plurality of previously trained models. In the examples, a "processor" may mean one or more processors, and a "memory" may mean one or more memories.

The processor 601 may calculate an entropy of each of a plurality of previously trained models based on training data. The processor 601 may select, based on the calculated entropy, one or more previously trained models to be used to train a target model. In an example, the processor 601 may select a previously trained model with a lowest entropy from the plurality of previously trained models. In another example, the processor 601 may select a first previously trained model and a second previously trained model from the plurality of previously trained models. In this example, a first entropy of the first previously trained model and a second entropy of the second previously trained model may have non-zero values. The processor 601 may train the target model based on the selected one or more previously trained models and training data.

The processor 601 may calculate a first loss value of the target model based on the training data. The processor 601 may calculate a second loss value for the target model and the previously trained model based on the training data. The processor 601 may acquire a first output value by inputting the training data to the previously trained model. In an example, the processor 601 may acquire a third output value by inputting the training data to the first previously trained model. The processor 601 may acquire a fourth output value by inputting the training data to the second previously trained model. The processor 601 may calculate the first output value by applying a weighted average to the third output value and the fourth output value based on the first entropy and the second entropy. The processor 601 may acquire a second output value by inputting the training data to the target model. The processor 601 may calculate the second loss value based on the first output value and the second output value.

The processor may 601 calculate the first loss value of the target model based on the training data. The processor 601 may calculate the second loss value of the target model using the first previously trained model and the second previously trained model. In an example, the processor 601 may calculate the first output value for the training data based on the first previously trained model and the second previously trained model. The processor 601 may acquire the second output value by inputting the training data to the target model. The processor 601 may calculate the second loss value based on the first output value and the second output value.

The processor 601 may calculate a final loss value based on the first loss value and the second loss value. For example, the processor 601 may acquire the final loss value by applying a weighted average to the first loss value and the second loss value. The processor 601 may then train the target model based on the final loss value. In an example, the model training apparatus 600 may further store instructions, for example, in memory 605, which when executed by the processor 601 configure the processor 601 to implement such one or more or any combination of operations.

In an example, the input/output interface 603 may be a display that receives an input from a user, or that provides an output. In an example, the input/output interface 603 may function as an input device, and may receive an input from a user through an input method, for example, a keyboard, a mouse, a touch input, a voice input, and an image input. Thus, the input/output interface 603 may include, as non-limiting examples, a keyboard, a mouse, a touchscreen, a microphone, and other devices that may detect an input from a user and transmit the detected input to the processor 601.

In an example, the input/output interface 603 may function as an output device, and provide an output of the model training apparatus 600 to a user through, for example, a visual, auditory, or tactile channel. The input/output interface 603 may include, for example, a display, a touchscreen, a speaker, a vibration generator, and other devices that may provide an output to a user.

Figure 7:
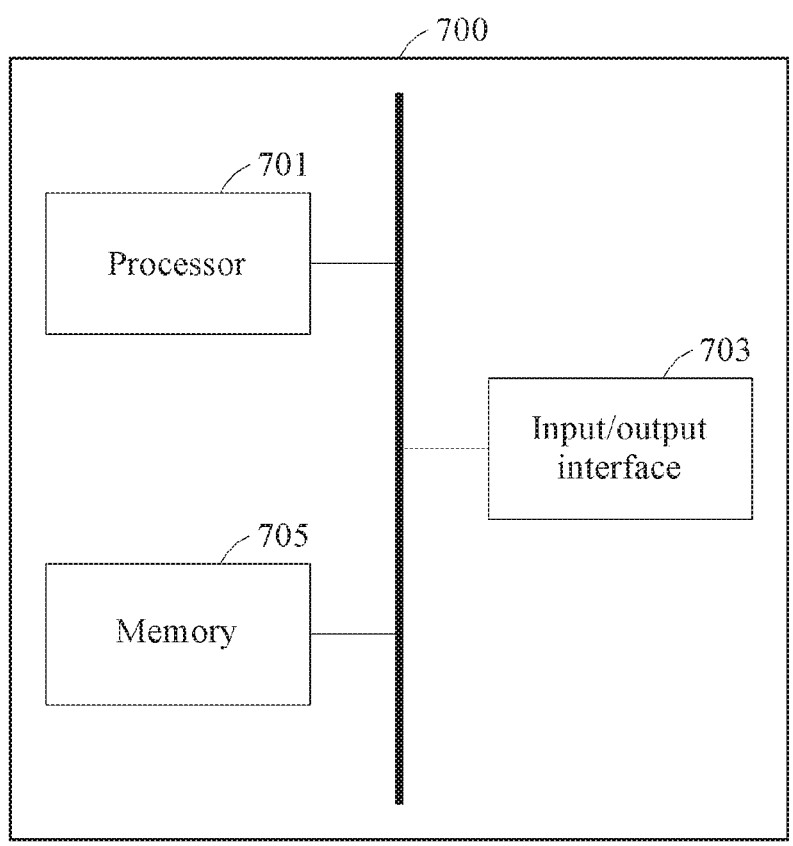
FIG. 7 illustrates an example speech recognition apparatus, in accordance with one or more embodiments.

FIG. 7 illustrates an example a speech recognition apparatus 700, in accordance with one or more embodiments.

Referring to FIG. 7, the speech recognition apparatus 700 may include one or more processors 701, an input/output interface 703 configured to receive speech input data of a user, and one or more memories 705 configured to store a target model. The processor 701 may acquire an output value by inputting the speech input data to the target model. The processor 701 may recognize a user based on the output value. The target model is a model trained using a previously trained model that is selected based on an entropy of each of a plurality of previously trained models based on the training data. In an example, the speech recognition apparatus 700 may further store instructions, for example, in memory 705, which when executed by the processor 701 configure the processor 701 to implement such one or more or any combination of operations. In an example, the speech recognition apparatus 700 may be configured as hardware may include a microprocessor, a central processing unit, a processor core, a multi-core processor, a multiprocessor, an application-specific integrated circuit (ASIC), and a field programmable gate array (FPGA).

The neural network apparatuses, corresponding processors, memories, and processor 601, memory 605, input/out interface 603, processor 701, input/output interface 703, memory 705, and other devices, and other components described herein, and with respect to FIGS. 1-7, are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-7, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method executed using at least one processor, the method comprising:
   implementing, by a processor, training operations of a model, including:
      generating, based on training data, an entropy of each of a plurality of previously trained models;
      selecting, based on the generated entropy of each of the plurality of previously trained models, two previously trained models from among the plurality of previously trained models wherein the two selected previously trained models have lowest entropy values among the plurality of previously trained models;
      generating a trained model by training a target model based on the training data, an output value derived from output values of the two selected previously trained models, and the generated entropies of the two selected previously trained models; and
      generating, by performing a convolution operation on input data by executing the trained target model, an output data, wherein:
   the generating of the entropy comprises:
      generating, based on the training data, by a first previously trained model, a first entropy corresponding to the training data; and
      generating, based on the training data, by a second previously trained model, a second entropy corresponding to the training data,
   the training of the target model comprises;
      determining a loss value based on the output values determined by applying ratios of the first entropy and the second entropy over a sum of both entropies to the output values of the first previously trained model and the second previously trained model as a weighted combination of the output values of the first and second previously trained models; and
      training the target model based on the determined loss value, and
   the first entropy of the first previously trained model and the second entropy of the second previously trained model have non-zero values.

2. The method of claim 1, wherein the training of the target model comprises:
   generating a first loss value of the target model based on the training data;
   generating a second loss value of the target model based on the first previously trained model and the second previously trained model;
   generating a final loss value based on the first loss value and the second loss value; and
   training the target model based on the final loss value.

3. The method of claim 2, wherein the final loss value is generated by applying a weighted average to the first loss value and the second loss value.

4. The method of claim 2, wherein the generating of the second loss value comprises:
   generating a first output value for the training data based on the first previously trained model and the second previously trained model;
   generating a second output value by inputting the training data to the target model; and
   generating the second loss value based on the first output value and the second output value.

5. The method of claim 4, wherein the generating of the first output value comprises:
   generating a third output value by inputting the training data to the first previously trained model;
   generating a fourth output value by inputting the training data to the second previously trained model; and
   generating the first output value by applying a weighted average to the third output value and the fourth output value based on the first entropy and the second entropy.

6. The method of claim 1, wherein the plurality of previously trained models is trained with different training data.

7. The method of claim 1, wherein the first previously trained model is trained with a first training data, the second previously trained model is trained with a second training data, the second training data is different than the first training data by having a different characteristic than the first training data.

8. The method of claim 1, wherein using the entropies of the two selected previously trained models to provide a reference output value for the training of the target model such that the target model learns more from most confident previously trained models than non-selected previously trained models.

9. The method of claim 1, wherein the first previously trained model and the second previously trained model are trained with training data that have different characteristics from each other such that the trained target model learns the characteristics of the training data, from most confident previously trained models, covering different situations to have better performance across diverse scenarios.

10. A processor-implemented method executed using at least one processor, the method comprising:
   receiving a speech input data of a user;
   generating an output value by inputting the received speech input data to a target model that has been trained; and
   recognizing, by performing a convolution operation on the speech input data using the target model, the user based on the output value,
   wherein the target model is trained by:
      generating, based on training data, an entropy of each of a plurality of previously trained models, where the generating of the entropy comprises:
         generating, based on the training data, by a first previously trained model, a first entropy corresponding to the training data; and
         generating, based on the training data, by a second previously trained model, a second entropy corresponding to the training data,
      selecting, based on the generated entropy of each of the plurality of previously trained models, a first previously trained model and a second previously trained model from among a plurality of previously trained models where the selected first and second previously trained models have lowest entropy values among the plurality of previously trained models, and
      generating a trained model by determining a loss value based on, an output value derived from output values of the selected first and second previously trained models which is determined by applying ratios of the first entropy and the second entropy over a sum of both entropies to the output values of the first previously trained model and the second previously trained model as a weighted combination of the output values of the first and second previously trained models, and training the target model based on the determined loss value, wherein the first entropy of the first previously trained model and the second entropy of the second previously trained model have non-zero values.

11. The method of claim 10, wherein using the entropies of the two selected previously trained models to provide a reference output value for the training of the target model such that the target model learns more from most confident previously trained models than non-selected previously trained models.

12. The method of claim 10, wherein the first previously trained model and the second previously trained model are trained with training data that have different characteristics from each other such that the trained target model learns the characteristics of the training data, from most confident previously trained models, covering different situations to have better performance across diverse scenarios.

13. A model training apparatus comprising:
a processor configured to:
  implementing training operations of a model, including:
    generate, based on training data, an entropy of each of a plurality of previously trained models;
    select, based on the generated entropy of each of the plurality of previously trained models, two previously trained models from among the plurality of previously trained models where the two selected previously trained models have lowest entropy values among the plurality of previously trained models;
    generate a trained model by training a target model, based on the training data, an output value derived from output values of the two selected previously trained models, and the generated entropies of the two selected previously trained models; and
    generate, by performing a convolution operation on input data using the trained target model, an output data,
  wherein the processor is further configured to:
    generate, based on the training data, by a first previously trained model, a first entropy corresponding to the training data;
    generate, based on the training data, by a second previously trained model, a second entropy corresponding to the training data;
    determine a loss value based on an output value determined by applying ratios of the first entropy and the second entropy over a sum of both entropies to the output values of the first previously trained model and the second previously trained model as a weighted combination of the output values of the first and second previously trained models; and
    train the target model based on the determined loss value,
  wherein the first entropy of the first previously trained model and the second entropy of the second previously trained model have non-zero values.

14. The apparatus of claim 13, further comprising:
an input/output interface configured to receive the training data, and
one or more memories storing the plurality of previously trained models.

15. The apparatus of claim 13, further comprising a memory of the one or more memories storing instructions which, when executed by the processor, configures the processor to perform the generating of the entropy, the selecting of the two previously trained models, and the training of the target model.

16. The apparatus of claim 13, wherein the plurality of previously trained models is trained with different training data.

17. The apparatus of claim 13, wherein the first previously trained model is trained with a first training data, the second previously trained model is trained with a second training data, the second training data is different than the first training data by having a different characteristic than the first training data.

18. The apparatus of claim 13, wherein using the entropies of the two selected previously trained models to provide a reference output value for the training of the target model such that the target model learns more from most confident previously trained models than non-selected previously trained models.

19. The apparatus of claim 13, wherein the first previously trained model and the second previously trained model are trained with training data that have different characteristics from each other such that the trained target model learns the characteristics of the training data, from most confident previously trained models, covering different situations to have better performance across diverse scenarios.

20. The apparatus of claim 13, wherein the processor is further configured to:
generate a first loss value of the target model based on the training data;
generate a second loss value of the target model based on the first previously trained model and the second previously trained model;
generate a final loss value based on the first loss value and the second loss value; and
train the target model based on the final loss value.

21. The apparatus of claim 20, wherein the processor is further configured to determine the final loss value by applying a weighted average to the first loss value and the second loss value.

22. The apparatus of claim 20, wherein the processor is further configured to:
generate a first output value for the training data based on the first previously trained model and the second previously trained model;
generate a second output value by inputting the training data to the target model; and
generate the second loss value based on the first output value and the second output value.

23. The apparatus of claim 22, wherein the processor is further configured to:
generate a third output value by inputting the training data to the first previously trained model;
generate a fourth output value by inputting the training data to the second previously trained model; and
generate the first output value by applying a weighted average to the third output value and the fourth output value based on the first entropy and the second entropy.

24. A processor-implemented method executed using at least one processor, the method comprising:
implementing, by a processor, training operations of a model, including:
  generating first entropies of first teacher models of a first characteristic;
  generating second entropies of second teacher models of a second characteristic different from the first characteristic;
  determining a lowest entropy of the first entropies of the first teacher models, and a lowest entropy of the second entropies of the second teacher models;

selecting one of the first teacher model and the second teacher model having a lowest entropy based on training data;

determining a loss value based on an output value determined by applying ratios of the first entropy and the second entropy over a sum of both entropies to the output values of the first selected teacher model and the second selected teacher model as a a weighted combination of the outputs values from the selected teacher models;

training a student model based on the determined loss value; and generating, by performing a convolution operation on input data by executing the trained student model, an output data, wherein the first entropies and the second entropies have non-zero values.

25. The method of claim 24, wherein the first characteristic is a first utterance distance, and the second characteristic is a second utterance distance that is different than the first utterance distance.

26. The method of claim 24, wherein the selected teacher model is based on an entropy for each frame of the training data.

27. The method of claim 24, wherein the first teacher models were trained with training data having the first characteristic, the second teacher models were trained with training data having the second characteristic being different than the first characteristic.

28. The method claim 24, wherein the selected first teacher model and the selected second teacher model are trained with training data that have different characteristics from each other such that the trained student model learns the characteristics of the training data, from most confident teacher models, covering different situations to have better performance across diverse scenarios.

* * * * *